United States Patent [19]

Ishida et al.

[11] Patent Number: 5,593,360
[45] Date of Patent: Jan. 14, 1997

[54] PLANETARY GEAR SYSTEM

[75] Inventors: Hiroki Ishida, Osaka; Junichi Tani, Daitou; Hiroshi Horie, Mukoh, all of Japan

[73] Assignee: Tsubakimoto Chain Co., Osaka-fu, Japan

[21] Appl. No.: 524,217

[22] Filed: Sep. 6, 1995

[30] Foreign Application Priority Data

| Sep. 8, 1994 | [JP] | Japan | 6-242265 |
| Sep. 8, 1994 | [JP] | Japan | 6-242266 |
| Sep. 8, 1994 | [JP] | Japan | 6-242267 |

[51] Int. Cl.$^6$ .................................................. F16H 1/00
[52] U.S. Cl. ........................................................ 475/331
[58] Field of Search ................................... 475/331, 344

[56] References Cited

U.S. PATENT DOCUMENTS

| 4,019,422 | 4/1977 | Magnuson | 89/1.815 |
| 4,946,428 | 8/1990 | Barozzi | 475/164 |
| 5,123,300 | 6/1992 | Himmelein et al. | 74/640 |
| 5,240,462 | 8/1993 | Mochizuki et al. | 475/342 |
| 5,242,336 | 9/1993 | Hori | 475/336 |
| 5,409,430 | 4/1995 | Hashimoto et al. | 475/331 |

*Primary Examiner*—Dirk Wright
*Attorney, Agent, or Firm*—Birch, Stewart, Kolasch & Birch, LLP

[57] ABSTRACT

A planetary gear system has a driving sun gear, an internal gear fixed on a case concentrically with the sun gear, and a planetary carrier assembly having plural planetary gears pivotally supported on a carrier and engaged with the sun gear and the internal gear. The internal gear comprises a lamination of plural punched plates with internal teeth being in phase with each other.

7 Claims, 7 Drawing Sheets

PLANETARY GEAR SYSTEM

BACKGROUND OF THE INVENTION

The present invention relates to a planetary gear system allowing the productivity to be increased and the cost to be reduced by employing, as an internal gear, a lamination of punched plates obtained, for example, by fine blanking.

FIELD OF THE INVENTION

A planetary gear system of internal gear type employing a sun gear, internal gear and planetary gear rotatably supported by a carrier is known, and has been widely used as a transmission mechanism for deceleration and acceleration.

However, the internal gear used in a planetary gear system is large in comparison with other gears, because it has a pitch diameter consistent with a peripheral trace of pitch circle of the planetary gear that is rotated about the sun gear, and partly increases the cost of an entire planetary gear system, as it is an internal gear, and mechanical gear cutting is limited to shaving, broaching and the like. Particularly, when plural planetary transmission stages are employed to obtain a high gear ratio, an internal gear is required for each stage, and the cost of a system is increased.

Planetary gear systems range from those used for transmitting a high horse power to small-sized ones of about 0.2 kW or less, and cost reduction is an essential requirement particularly for small-sized systems.

Thus, although sintered gears formed by using metal powders, molded resin gears made of synthetic resins and the like have been conventionally employed as an internal gear for small-sized planetary gear systems, such molded gear requires molds that are costly, an accuracy of teeth and an entire gear is reduced by compression and other change in shape during molding, a strength is insufficient, an internal gear itself is increased in size, and prevents reduction in size of a planetary gear system for transmitting a low torque.

On the other hand, the internal gear is locked and contained in a case as a stationary member, and conventionally a bolt extending in the axial direction and engaging with a case has been inserted through the internal gear, or such anchoring member as a key engaging with the case is fitted over an outer circumferential part of the internal gear to lock it. However, in the case such bolt should be employed, besides a bolt hole, tapping process and costs associated with the bolt are required, a radial thickness of internal gear must be increased to provide the gear with the bolt hole, and reduction in size of a system is obstructed. In the case of using a key or the like, a cost is increased because of the key and key seating process, and it is required to increase the thickness of a member in which the key seat is provided.

It is hence a primary object of the invention to provide a planetary gear system containing an internal gear relatively inexpensive in cost and high in accuracy basically by forming the internal gear using a lamination of plates punched, for example, by means of fine blanking.

According to one aspect of the present invention, a planetary gear system comprising a case, a driving sun gear pivotally supported on the case, an internal gear fixed on the case concentrically with the sun gear, and a planetary carrier assembly having plural planetary gears pivotally supported on a carrier and engaged with the sun gear and the internal gear. The internal gear comprises a lamination of plural ring-shaped punched plates with internal teeth formed by punching which are laminated so that the internal teeth of the punched plates are in phase with each other.

The punched plate may be formed by fine blanking.

The punched plate may have plural convex portions on one side surface thereof and plural concave portions on the other side surface thereof so that the convex and concave portions between the punched plates overlaid by each other are engaged to arrange the internal teeth of the punched plates in phase with each other.

The convex portions on one side surface of the punched plate and the concave portions on the other side surface of the punched plate may be provided substantially in an identical position, and the convex portions and concave portions may be formed by half punching to have a same dimension to each other.

The case may have concave portions or convex portions engaged with convex portions or concave portions disposed on both outer side surfaces of the lamination of punched plates, and this engagement may be in an interference-fitted manner.

The case may be provided with an annular bearing disposed adjacently to the internal to support rotatably a disk shaped carrier of the planetary carrier assembly.

As a lamination of punched plates with internal teeth punched by fine blanking is employed as an internal gear, production efficiency is increased, inexpensive products can be provided, and quality of the products is stable. Additionally, by means of fine blanking, an accuracy of the teeth can be increased, because punched plates are not thick, and a high punching accuracy can be achieved. Further, the strength of internal gear can be adjusted by varying the number of plates laminated according to a strength required.

Moreover, since an internal gear forms a ring comprising a lamination of punched plates, a rigidity in the radial direction is reduced in comparison with that of an integral gear of uniform thickness, a flexibility in the radial direction is increased, resulting in improvement of tooth contact between a planetary gear and an internal gear, as a result.

Although an accurate processing can be achieved by fine blanking, when a blank is punched against a female die, a lifting taper m, that is, an outer periphery arcuately changed in shape in the form of a draft tends to be caused in a punched plate, as shown in an alternately long and short dashed line in FIG. 4. Such lifting taper m forms a small recess between adjacent punched plates as the plates are laminated, and a lubricant lasts longer, because the recess forms a reservoir for lubricant and grease, providing for a longer life of gear.

By engagement between the concave and convex portions of the punched plates, internal teeth of punched plates can be easily aligned and arranged in phase. By providing concave and convex portions in front and back sides of the plate in an identical position, the internal teeth can be arranged properly in shape in the axial direction by their engagement. A play in engagement of a gear system can be reduced by arranging internal teeth in phase such that the convex and concave portions in front and back sides of the plate are slightly offset in the circumferential direction with each other so that a sum of the offsets in a lamination is within a backlash of engagement between the internal and planetary gears.

Any phase error of internal teeth caused by an engagement error between the plates can be eliminated by forming the convex and concave portions at uneven pitch angles, and allowing punched plates to be laminated only in a predetermined position.

Because the convex and concave portions of the plate are formed by half punching, the productivity is increased, and internal teeth can be properly aligned in phase in the axial direction by their engagement.

The cost reduction is further enhanced, and a stable quality can be achieved by integrally and simultaneously producing an outer circumferential surface, internal teeth and concave and convex portions of the punched plate by means of blanking.

An internal gear can be locked without using a bolt, key or the like by engaging a convex or concave portion in either side of the internal gear with a concave or convex portion provided in an adjacent case. In the case, the engagement is in the form of interference fit, they can be firmly locked, and the locking is achieved at a low cost in a simple manner, providing for size reduction. If no concave portion is provided in a case, more punched plates and types of dies are required, the controllability is reduced, and the cost is increased because of such reason that a convex portion in a side of internal gear becomes an obstruction.

By supporting an outer circumferential surface of the carrier by means of an annular bearing comprising self-lubricating member, the annular bearing and carrier can be formed in an identical width, as the outer circumferential surface of carrier is generally in a larger diameter, and a bearing pressure is relatively low. As a result, dimensional increase in the axial direction of a system can be controlled, and a simpler structure can be employed. Specifically, because the annular bearing can be shaped in a simple form, it can be easily manufactured at a low cost, for example, by molding process.

In the case the annular bearing is molded by using a synthetic resin, noises caused by contact with the carrier can be reduced. In the case plural planetary transmission stages are employed, when opposing carriers of adjacent planetary transmission stages are supported by means of a wide annular bearing, the adjacent transmission stages can be maintained in a concentric state.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
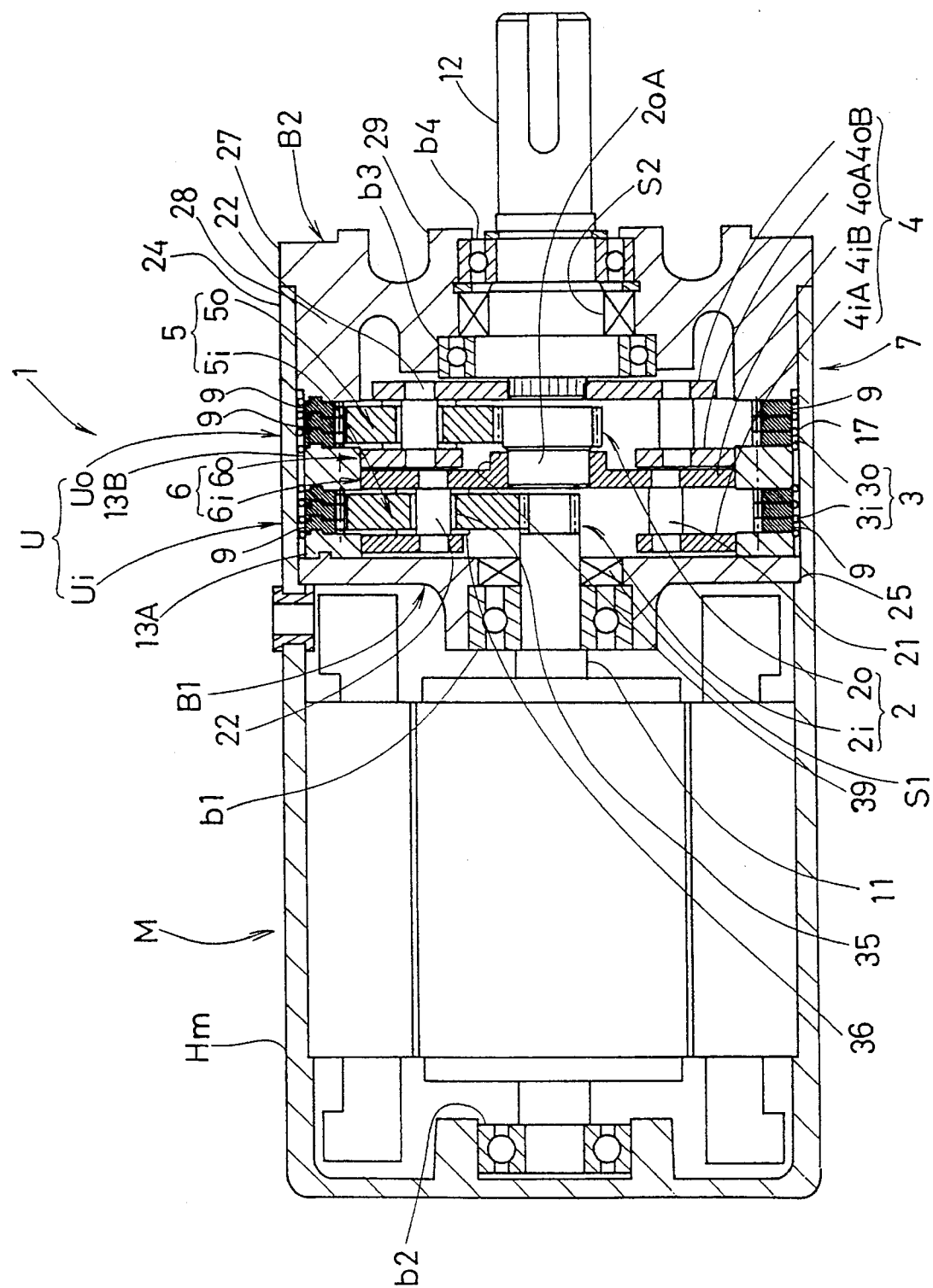
FIG. 1 is a sectional view showing an embodiment of the invention.
Figure 2:
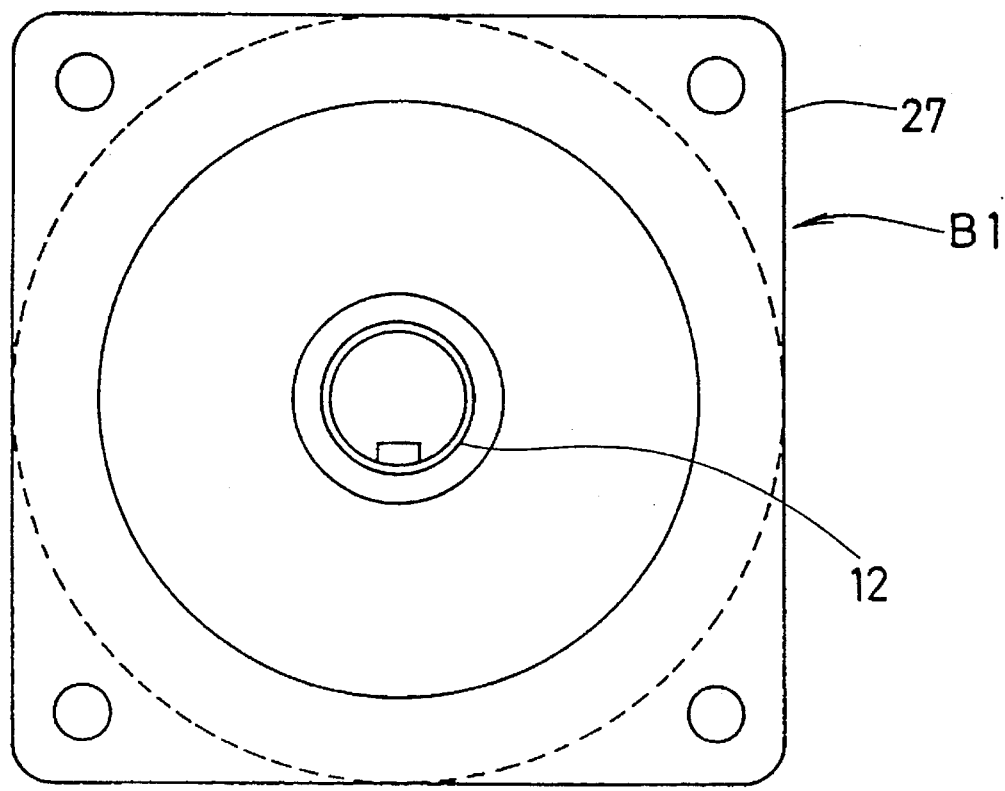
FIG. 2 is a front view of the embodiment.
Figure 3:
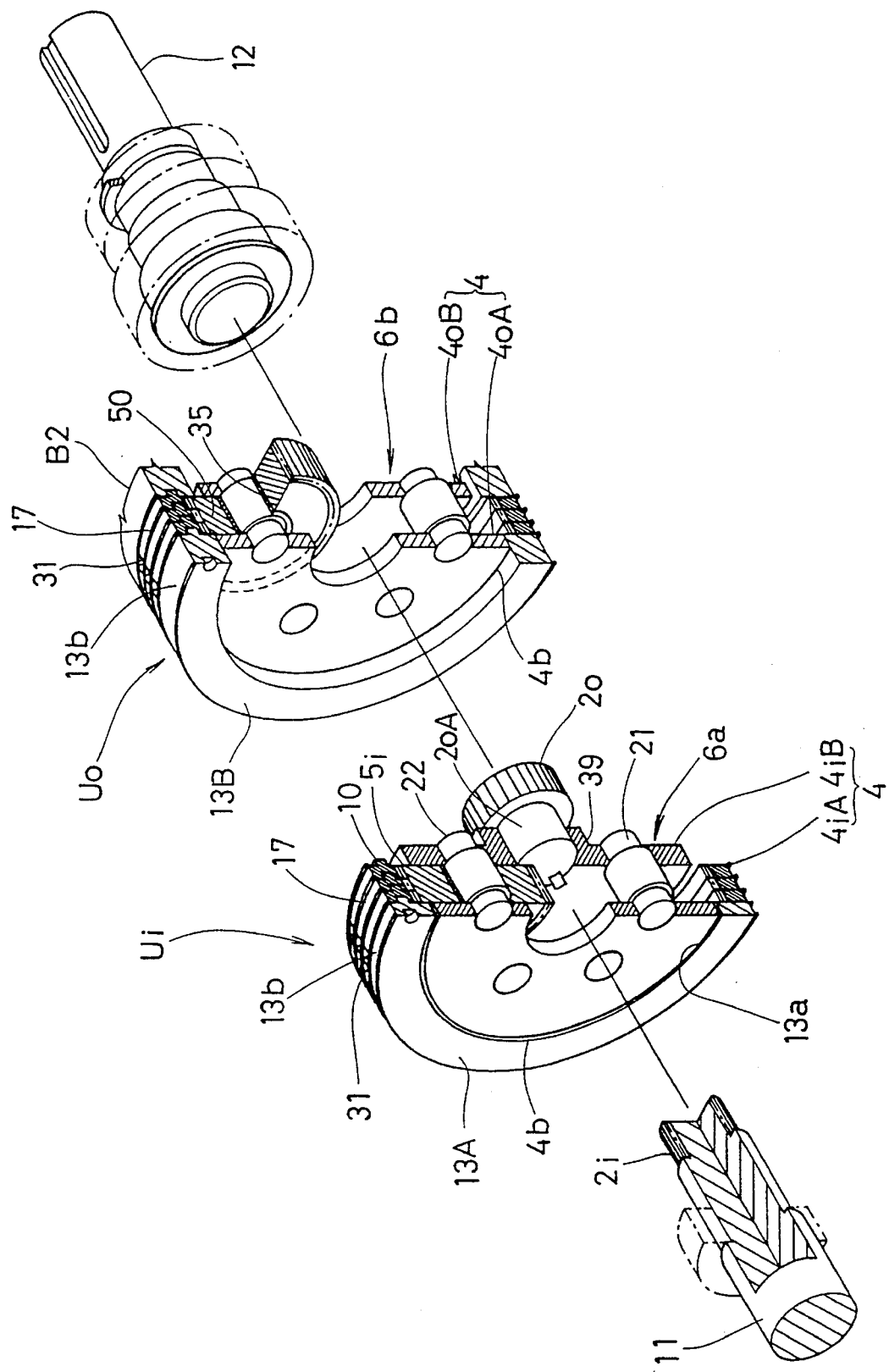
FIG. 3 is an exploded perspective view showing a main part of the embodiment.

FIGS. 1 to 6 show an embodiment, wherein a planetary gear system 1 is provided with one or more planetary transmission stages U comprising a sun gear 2, a internal gear 3, a planetary carrier assembly 6 with planetary gears 5 rotatably and integrally contained in a carrier 4 and a case 7 supporting the planetary transmission stages U. In the embodiment, the planetary gear system 1 is formed as a flange-type gear motor with an electric motor M.

The planetary transmission stages U include two planetary transmission stages Ui, Uo (suffixes i and o are hereinafter used for distinguishing between input and output sides) of input and output sides in the embodiment. The planetary transmission stage Ui in the input side consists of a driving sun gear 2i provided in a leading end of a rotor shaft of the electric motor M, that is, an input shaft 11 of the planetary gear system 1, an internal gear 3i fixed to and supported by the case 7 in such manner that it concentrically surrounds the sun gear 2i, and a rotatable planetary carrier assembly 6i containing planetary gears 5i.

Figure 7:
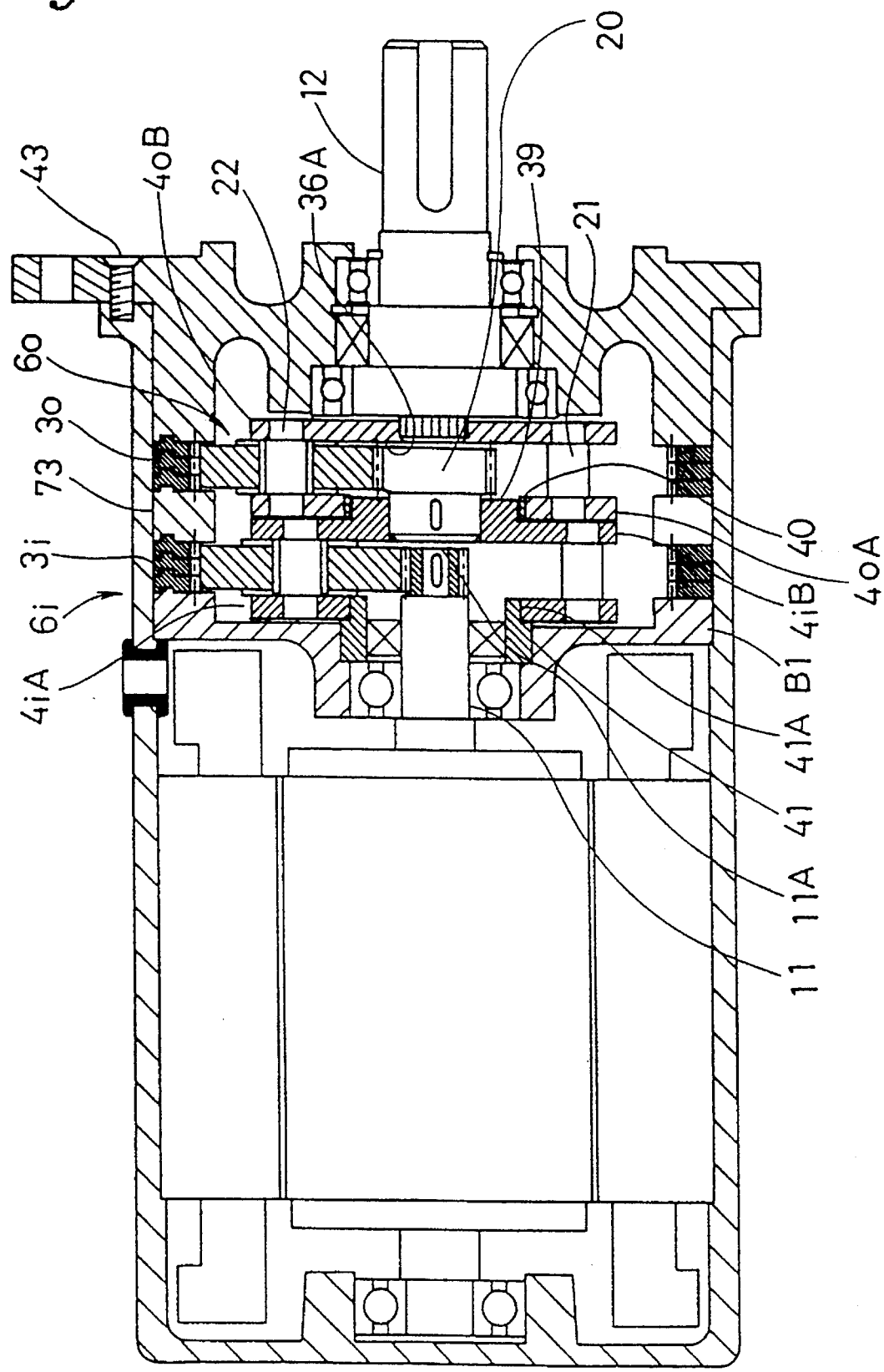
FIG. 7 is a sectional view showing another embodiment.

The planetary carrier assembly 6i comprises two carriers 4iA, 4iB in the form of a disk disposed in opposition to each other, plural coupling shafts 21 and supporting shafts 22 coupling the carriers 4iA and 4iB and planetary gears 5i pivotally supported by the supporting shafts 22. The planetary carrier assembly 6i is driven in concentricity with the sun gear 2i by the planetary gears 5i engaging with the sun gear 2i and internal gear 31. The carriers 4iA, 4iB are rotatably supported by inner circumferential surfaces of first and second annular bearings 13A, 13B adjacently disposed to each other in opposite sides of the internal gear 3. The sun gear 2i can be formed separately from the input shaft 11 without directly cutting teeth in the shaft, as shown in FIG. 7, and coupled to the input shaft 11 by means of a key, for example.

The planetary transmission stage Uo in the output side consists of a sun gear 2o fixed in a central part of the carrier 4iB, an internal gear 3o supported by the case 7 concentrically with the sun gear 2o, and a planetary carrier assembly 6o with planetary gears 5o rotatably supported between two disk-shaped carriers 4oA and 4oB in a similar manner. The carrier 4oA in the input side is rotatably supported by an inner circumferential surface 13a of the second annular bearing 13B, and a trailing end of output shaft 12 is fixed to the carrier 4oB in the output side.

The case 7 comprises a bottomed cylindrical motor housing Hm enclosing a stator of the electric motor M, a bracket B1 in the input side inserted to a receiving part 24 of the motor housing Hm extending beyond the stator, and a bracket B2 in the output side fitted to a front end of the receiving part 24. Between the brackets B1 and B2, the first annular bearing 13A, internal gear 3i, second annular bearing 13B and internal gear 3o are sequentially disposed from the input side adjacently to each other in alignment. Therefore, the annular bearings 13A, 13B receive outer surfaces 4b of the carriers 4iA, 4iB, 4oA, rotatably supports them in concentricity with the sun gears 2i, 2o, and serve as spacers for maintaining a spacing between the bracket B1 and internal gears 3i, 3o.

In the motor housing Hm, a step 25 positioning the bracket B1 in the input side is provided between the receiving part 24 and a part housing the stator. The input shaft 11, thus, the sun gear 2i is supported concentrically with the receiving part 24 by means of a bearing b1 in the bracket B1 and a bearing b2 in a bottom of the motor housing Hm. The bracket B2 in the output side has a flange 27 with attachment holes in four corners thereof, an outer cylindrical part 28 inserted and fixed to the receiving part 24, and an inner cylindrical part 29 rotatably supporting the output shaft 12 concentrically with the sun gear 2i by means of bearings b3 and b4. The input shaft 11 and output shaft 12 are sealed by seals S1, S2.

The motor housing Hm may be formed such that the part housing the electric motor M and the receiving part 24 are coupled separately to each other.

Each of the internal gears 3i, 3o comprises a lamination of punched plates 9, and the punched plates 9 are formed, for example, by fine-blanking a metal plate. The punched plate 9 is an annular member in which an inner circumferential surface 9 having internal teeth 3A and an outer circumferential surface 9b having a recessed groove 31 confirming a mating position are formed by punching. The punched plate 9 is also provided with concave portions 10A in one side thereof and convex portions 10B shaped and dimensioned for allowing engagement with the concave portions 10A in the other side, respectively. The concave and convex portions 10A, 10B form an engaging arrangement 10 for phase.

Here, the fine blanking is a press working method suggested by Fritz Schicess, Switzerland, in 1923, and a surface of breakage due to cracking is controlled by using a punching die of a very small clearance with a plate presser and a reverse presser, applying a compression force to a plate, and increasing its ductility. When a metal plate is in the form of a sheet, specifically foreseeing a cut surface is crisp, and has a high accuracy, the internal gear 3 can be manufactured at a lower cost and an acceptable accuracy by forming a lamination of punched sheet plates 9. A thickness of the punched plate 9 is about 1.5 to 3.5 mm, 2.2 to 2.8 mm in the embodiment, and a plate comprising such alloyed steel superior in strength and toughness as chromiummolybdenum steel can be preferably employed.

The outer circumferential surface 9b of the punched plate 9 is about 50 to 120 mm in outer diameter, and the internal teeth 3A of inner circumferential surface 9a is about 0.5 to 1.25 modules. Because a punching accuracy is increased as a thickness of the plate is reduced, punching at a lower module can be achieved. It was confirmed that about 0.7 modules is allowed when a thickness of the plate is about 2.5 mm. After punching, a stress relief processing can be conducted, or adequate surfaces and teeth may be subjected to such hardening process as immersion, nitriding and Tuftride, in such case, it is preferred to avoid any strain by using the lowest temperature and shortest time as possible.

Thus, because a lamination of precisely punched plates by fine blanking is employed as the internal gear 3, production can be efficiently conducted at a low cost, and a stable quality is obtained. An accuracy of the tooth can be increased by a higher precision of punching, and a strength of the internal gear 3 can be also adjusted by varying the number of plates laminated according to a strength required.

Moreover, since the internal gear 3 comprises a lamination of punched plates 9, a rigidity in the radial direction is reduced in comparison with that of an integral gear of uniform thickness, a flexibility in the radial direction is increased, resulting in improvement of tooth contact. As shown in an alternately long and short dashed line in FIG. 4, a lifting taper m formed when a blank is punched against a female die forms reservoir for lubricant oil and grease, allowing a lubricant to last long, and providing for a longer life of the internal gear 3.

Further, with respect to the engaging arrangement 10, the concave portions 10A in one side and the convex portions 10B in other side are formed in relation with a phase of the internal tooth 3A. In other words, when the concave and convex portions 10A, 10B are disposed in an identical position in front and back sides, a tooth trace of the internal teeth 3A in all punched plates 9 can be properly arranged in phase in the axial direction. In the case the concave and convex portions 10A, 10B are in an identical position in front and back sides, and in complementary shapes, they can be formed by half punching.

The concave and convex portions 10A, 10B in front and back sides can be also slightly offset in angle in the circumferential direction within a range of backlash of engagement between the internal gear 3 and planetary gear 5. In this way, since the internal teeth 3A are arranged in phase to incline the tooth trace of the lamination within a range of the backlash, transmission by gears engaged without any play can be achieved.

The engaging arrangement 10 for phase is formed such that pitch angles q1 to qn between adjacent concave portions 10A or adjacent convex 10B are uneven at 150 degrees, 120 degrees and 90 degrees, for example. Only an angle may different from others. As a result, because the convex portions 10B and concave portions 10A can always be engaged only in a predetermined position for a phase of the internal tooth 3A, automatic manual or mechanical assembly can be facilitated, and an engagement error is eliminated. By providing a portion 10A or 10B appropriately in a forth position in addition to three (n) angular positions equally distributed, for example, a similar effect can be obtained.

Figure 4:
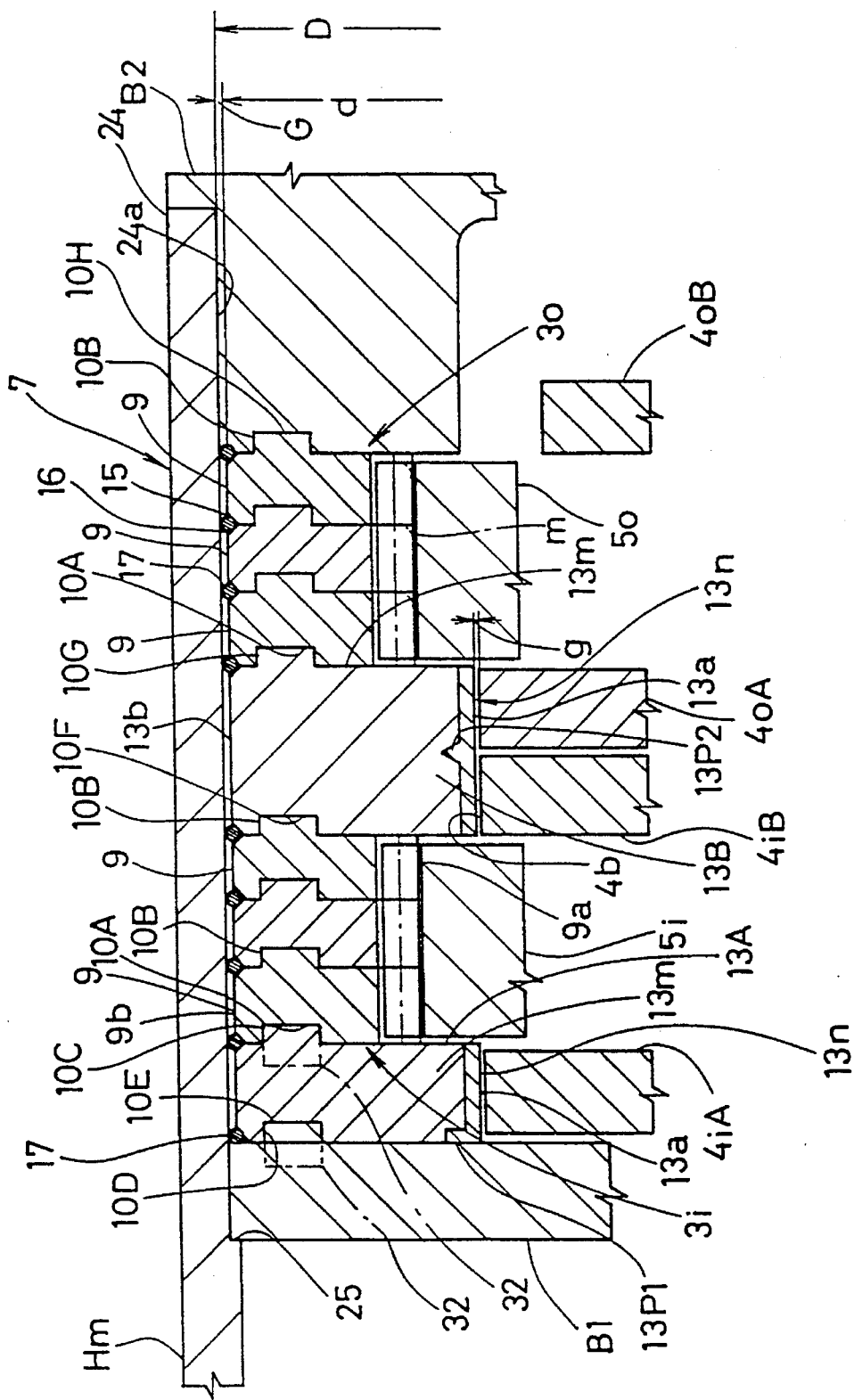
FIG. 4 is a sectional view illustrating an internal gear assembled with a spacer and an elastic member.
Figure 5:
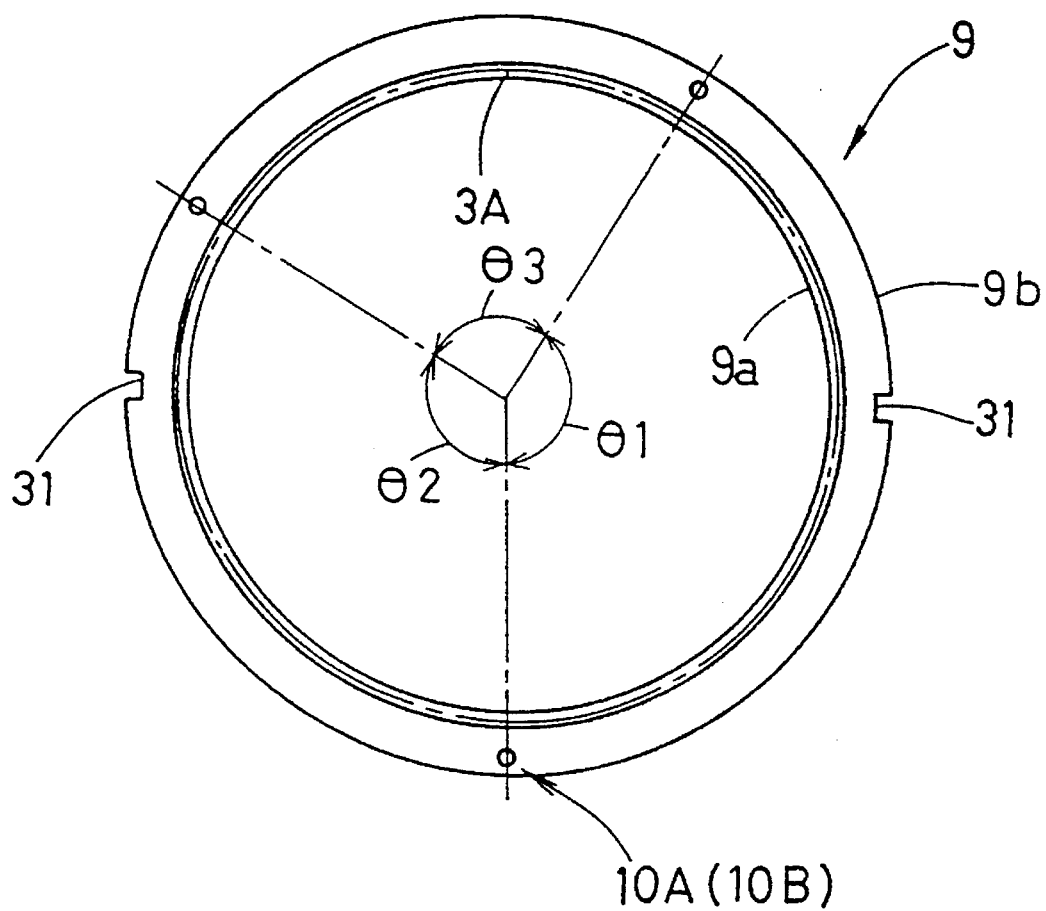
FIG. 5 is a front view illustrating a punched plate.
Figure 6:
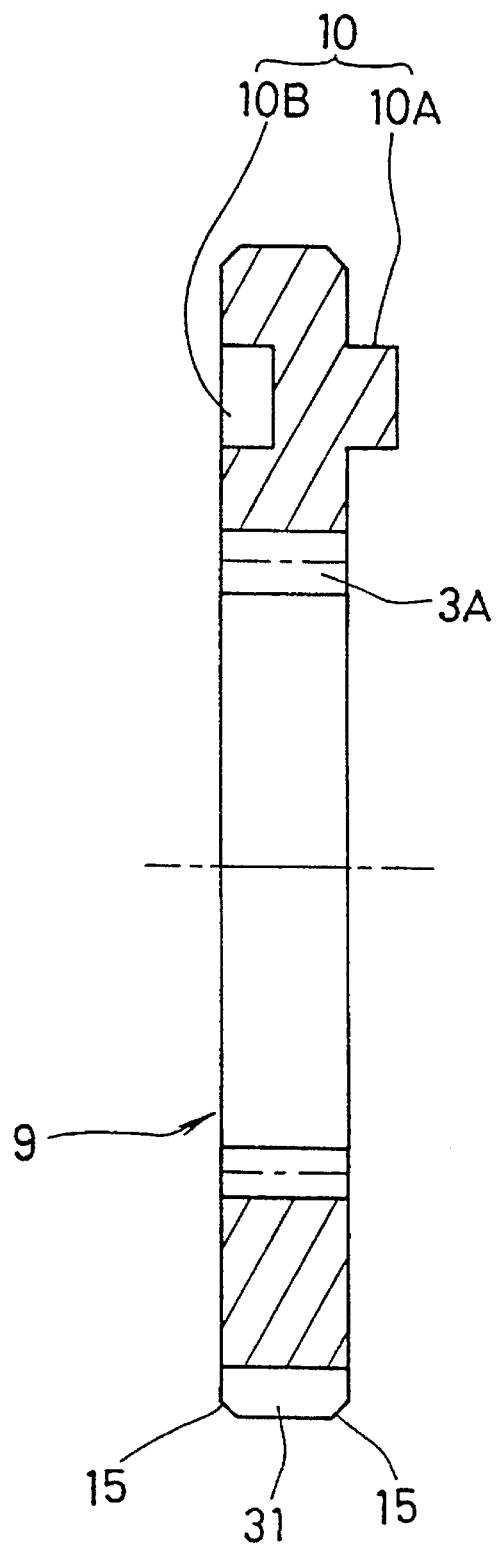
FIG. 6 is a sectional view of the punched plate.

As shown in a magnified view in FIG. 4, the concave portions 10A provided in a side surface of the input side of internal gear 3i are engaged with convex portions 10C in a side surface of the output side of the first annular bearing 13A. Similar concave portions 10D are formed also in a side surface of the input side of first annular bearing 13A, and engaged with convex portions 10E in an adjacent bracket B1 in the input side. The convex portions 10B located in a side surface in the output side of internal gear 3i are engaged with concave portions 10F provided in a side surface in the input side of second bracket B2. With the internal gear 3o, similarly, the concave portions 10A in a side surface in the input side of the internal gear 3o are engaged with convex portions 10G in a side surface in the output side of second annular bearing 13B, and the convex portions 10B in a side surface in the output side of internal gear 3o are engaged with concave portions 10H in the output side of bracket B2.

In this way, as the convex and concave portions 10A to 10H between adjacent surfaces are engaged with each other, and lock the entirety, the internal gears 3, annular bearings 13A, 13B and brackets B1, B2 are integrated, and prevented from being displaced from each other in the circumferential and radial directions. By engaging the concave and convex portions in an interference-fitted manner, they can be integrally coupled in the axial direction as well. In the case the bracket B2 in the output side can be firmly fitted to the receiving part 24, they can be more firmly integrated in the axial direction.

The concave and convex portions may be in the directions reverse to those shown in the figure. Or the concave portions 10D and convex portions 10E in the first annular bearing 13A and bracket B1 may be located in circumferential and radial positions different from other concave and convex portions. The convex and concave portions may be formed in such various shapes as rectangular and non-circular shapes in addition to a circular shape. In the case the first and second annular bearings 13A, 13B, and brackets B1, B2 are not formed as moldings by press molding, die casting and the like, they may be provided each with a concave portion, and coupled by means of a positioning pin 32 shown in an alternately long and short dashed line in FIG. 4.

The recessed grooves 31 in an outer circumference of the punched plate 9 are positioned opposite to each other on a radial line in the embodiment. The recessed grooves 31 provide an induce for phase alignment, and can serve for integrating a lamination of punched plates by inserting, for example, a C-shaped fixture (not shown) extending in the direction of shaft center to the recessed grooves 31 in alignment.

In the embodiment, because both diameters d of an outer circumferential surface 9b of the punched plate and an outer circumferential surface 13b of the second annular bearings 13A, 13B are slightly less than an inner diameter D of an inner circumferential surface 24a of the receiving part 24 of motor housing Hm, as shown in FIG. 4, an average spacing G is formed in a region between the brackets B1, B2.

On the other hand, a continuous chamfer 15 is provided in peripheries in both sides of the outer circumferential surface 9b of punched plates 9 and peripheries in both sides of the outer circumferential surface 13b of annular bearings 13A, 13B, and a U- or V-shaped groove 16, for example, is formed by two each chamfers 15, 15. A vibration insulator 17 comprising, for example, a rubber (oil resistant rubber), which is an O ring in the embodiment, is provided in the groove 16, respectively.

The vibration insulator 17 may be of such non-circular shape as triangular and star shapes as well as a tubular shape alternatively to a circular shape in section. The vibration insulator 17 may be adhered to the groove 16 beforehand, in such case, it is not required to form the insulator in an annular form but in the form of one to several strips. It is preferred that the groove 16 is relatively so deep as more than ½ and ⅔ or less of a radial height of the rubber to avoid displacement at the time of attachment to the case 7. A rubber coating layer may be formed by bonding, or a rubber sheet may be provided on the outer circumferential surfaces 9b, 13b of punched plates and annular bearings 13.

As mentioned above, the punched plates 9 and annular bearings 13 are supported, in the receiving part 24, by inserting the vibration insulator 17 in contact with an inner circumferential surface 24a of the receiving part 24. As a result, the internal gear 3 formed by a lamination of punched plates 9 provides a shock-absorbing function, and serves for reducing impacts at engagement with the planetary gear 5. Further, because the impacts and vibrations themselves are absorbed, reduced, and prevented from being transmitted to the motor housing Hm by the vibration insulator 17, dispersion of the vibrations and sounds can be controlled, and noises and vibrations of a system are reduced.

Because of the vibration insulator 17 comprising an O ring employed in the embodiment, a cost is reduced, attachment is facilitated, and an entire system is simplified in structure, reduced in cost, and can be assembled by simply laminating the internal gear 3 and the like in combination with the annular bearings 13, resulting in further cost reduction.

As described, the vibration insulator 17 prevents vibrations and noises caused by the planetary transmission stages U to be transmitted to the motor housing Hm, reduces generation and transmission of the vibrations and noises between the internal gear 3 and the case 7 even if the case 7 is of metal, for example, and serves for absorbing impacts in tooth contact between the internal gear 3 and planetary gear 5 and centering them.

In the embodiment, the first and second annular bearings 13A, 13B are used for rotatably supporting carriers 4iA, 4iB, 4oA. Then, the vibration insulator 17 of annular bearings 13A, 13B also serves for avoiding vibrations caused by rotation of the planetary carrier assemblies 6i, 6o to be transmitted through the receiving part to the outside.

Since the first and second annular bearings 13A, 13B have the inner and outer circumferential surfaces 13a, 13b concentric with each other, and the outer circumferential surface 13b is fitted, as described, to the receiving part 24 of motor housing Hm that is concentric with the input shaft 11 with the vibration insulator 17 disposed between them, the inner circumferential surface 13a thereof is concentric with the input shaft 11.

The first and second annular bearings 13A, 13B may be entirely formed by such self-lubricating material as fluororesins, such self-lubricating synthetic resins as hard resins containing molybdenum sulfide or other lubricant and oil-impregnated metals. Or the annular bearings 13A, 13B comprise, as shown in FIG. 4, an annular base member 13m and a thin bearing ring 13n formed by the bearing material that is disposed in the inner circumferential side of the base member 13m, and retained by retaining parts 13P1, 13P2 in the form of projections.

A diameter of the inner circumferential surface 13a is less than the tip diameter of the internal gears 3i, 30. The first annular bearing 13A supports the carrier 4iA, while the second annular bearing 13B supports the carrier 4iB and the carrier 4oA so that both of them are concentric with the input shaft 11. Accordingly, the second annular bearing 13B is formed with an axial width twice that of the first annular bearing 13A. The concentricity between the planetary carrier assemblies 6i and 6o is increased by supporting with the common bearing 13B. As described above, the carrier 4oB in the output side of planetary carrier assembly 6o comes to be concentric with the receiving part 24 and thus the input shaft 11 by fixing a trailing end of the output shaft 12 thereto.

In the carriers 4iA, 4iB, 4oA supported rotatably by the first and second annular bearings 13A, 13B, the outer circumferential surface 4b forms a circle with such diameter that it comes in contact with the inner circumferential surface 13a of annular bearings 13A, 13B, and an average spacing g in the radial direction between the outer circumferential surface 4b of carrier and the inner circumferential surface of annular bearings 13A, 13B is determined according to a tolerance of center distance at an accuracy required for a particular gear.

The carriers 4iA, 4iB of the planetary carrier assembly 6i and the carriers 4oA, 4oB of the planetary carrier assembly 6o are integrated with each other by the plural coupling shafts 21 provided with a step in either side and plural supporting shafts 22 shaped identically with the coupling shafts 21. The planetary gears 5i, 5o are rotatably supported, respectively, by the supporting shafts 22 with a cylinder bearing 35 and thrust bearings 36, 36 (schematically shown in FIG. 1 only). The planetary carrier assemblies 6i, 6o are constructed in such manner. The planetary carrier assembly 6i is supported concentrically with the input shaft 11 by arranging such that the carriers 4iA, 4iB are guided by the inner circumferential surface 13a of annular bearings 13A, 13B.

The carrier 4iB in the output side of planetary carrier assembly 6i has a boss 39 projecting toward the output side in a central part thereof, a reduced end portion 2oA in diameter of the sun gear 2o is inserted and integrally fixed to a central hole of the boss 39, and the sun gear 2o is thereby positioned concentrically with the sun gear 2i. For retaining the sun gear 2o against rotation, a variety of such known methods can be employed as a key, notch, knurl, press-fitting and adhesion.

In the planetary gear stage Ui, the planetary gear 5i of carrier assembly 6i is engaged with the sun gear 2i of input shaft 11 that is the rotor shaft and the internal gear 3i, and the sun gear 2o of planetary transmission stage Uo is thereby rotated at a revolving speed of the planetary gear 5*i* that is obtained by reducing the number of revolutions of the input shaft 11 by the known reduction gear ratio determined according to the gear ratio.

Similarly, the planetary carrier assembly 6*o* is supported concentrically with the input shaft 11, and rotated in such manner the carrier 4*o*A in the input side is guided by the inner circumferential surface 13*a* of annular bearing 13B, and the carrier 4*o*B in the output side is fixed to a trailing end of the output shaft 12.

As a result, in the planetary carrier assembly 6*o*, the planetary gear 5*o* is engaged with the sun gear 2*o* and the internal gear 3*o*, and the output shaft 12 is, therefore, rotated by means of the carrier 4*o*B at a revolving speed of the planetary gear 5*o* that is obtained by further reducing the number of revolutions of the sun gear 2*o* that is rotated at a revolving speed of the planetary gear 5*i* by the known reduction gear ratio determined according to the gear ratio.

Thus, in the embodiment, the planetary carrier assembly 6 can be rotated concentrically with the sun gear 2 by allowing the carriers 4*i*A, 4*i*B, 4*o*A to be pivotally supported by an annular bearing composed of the annular bearings 13A, 13B, and supported evenly, a simpler structure is achieved, and an axial length can be reduced.

In FIG. 7, another embodiment according to the invention is shown, in which internal gears 3*i*, 3*o* are directly attached to a case 7 without a vibration insulator 17 inserted between them, and planetary carrier assemblies 6*i*, 6*o* are not rotatably supported by using the annular bearings 13A, 13B.

In the embodiment, a spacer annular bearing 73 is provided between the internal gears 3*i* and 3*o*. In the planetary carrier assembly 6*o* in the output side with carriers 4*o*A and 4*o*B coupled integrally by means of coupling shaft 21 and supporting shaft 22, as the carrier 4*o*B in the output side is fixed to the output shaft 12, the carrier 4*o*A in the input side is also supported concentrically.

The planetary carrier assembly 6*i* in the input side is supported in such manner that a boss 39 in a carrier 4*i*B in the output side thereof is pivotally supported in a central hole provided in the carrier 4*o*A by means of a bearing 40, and a central hole provided in a carrier 4*i*A in the input side is supported by sheathing a projection 41A of a bearing cylinder 41 that is fitted concentrically with the input shaft 11 over the first bracket B1.

Further in the embodiment, a thrust bearing 36A is provided between the sun gear 2*o* and the carrier 4*o*B, and the sun gear 2*i* is inserted and integrally fixed to a reduced end portion 11A in diameter of the input shaft 11. The second bracket B2 is mounted on the case 7 by screw 43.

A planetary gear system according to the invention may be provided as a so-called reduction and speed up gear system without using the motor M alternatively to the embodiments, or provided with feet, instead of flanges, or one or three or more planetary transmission stages. A system according to the invention can be modified in such various ways as forming the carrier 4*o*B in the output side of planetary carrier assembly 6*o* integrally with the output shaft, and fixing the bracket by using a bolt and a screw.

What is claimed is:

1. A planetary gear system comprising
   a case,
   a driving sun gear pivotally supported on the case,
   an internal gear fixed on the case concentrically with the sun gear, and
   a planetary carrier assembly having plural planetary gears pivotally supported on a carrier and engaged with the sun gear and the internal gear, wherein
      the internal gear comprises a lamination of plural ring-shaped punched plates with internal teeth formed by punching which are laminated so that the internal teeth of the punched plates are in phase with each other.

2. The planetary gear system according to claim 1, wherein each of the punched plates is formed by fine blanking.

3. The planetary gear system according to claim 1, wherein
   each of the punched plates has plural convex portions on one side surface thereof and plural concave portions on the other side surface thereof,
   the convex portions and the concave portions between the punched plates overlaid by each other are engaged so as to arrange the internal teeth of the punched plates in phase with each other, and
   an angular pitch between the adjoining convex portions in the circumferential direction or between the adjoining concave portions in the circumferential direction is uneven.

4. The planetary gear system according to claim 3, wherein the convex portions on one side surface of each of the punched plates and the concave portions on the other side surface of each of the punched plates are provided substantially in an identical position, and the convex portions and concave portions are formed by half punching so as to have a same dimension to each other.

5. The planetary gear system according to claim 3, wherein the case has concave portions or convex portions engaged with convex portions or concave portions disposed on both outer side surfaces of the lamination of punched plates.

6. The planetary gear system according to claim 5, wherein the concave portions or convex portions of the case are engaged with convex portions or concave portions disposed on both outer side surface of the lamination of punched plates in an interference-fitted manner.

7. The planetary gear system according to claim 1 wherein
   the case is provided with a annular bearing disposed adjacently to the internal gear concentrically with the sun gear and having an inner circumferential surface of a lubricating member, and
   the carrier of the planetary carrier assembly is in the form of a disk of which an outer circumferential surface is rotatably supported by the inner circumferential surface of the annular bearing.

\* \* \* \* \*